(12) United States Patent
Young

(10) Patent No.: US 7,132,805 B2
(45) Date of Patent: Nov. 7, 2006

(54) INTELLIGENT DRIVE CIRCUIT FOR A LIGHT EMITTING DIODE (LED) LIGHT ENGINE

(75) Inventor: Garrett Young, Farmingdale, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 10/913,451

(22) Filed: Aug. 9, 2004

(65) Prior Publication Data

US 2006/0028155 A1   Feb. 9, 2006

(51) Int. Cl.
  H05B 37/02   (2006.01)
  H01S 3/10   (2006.01)
(52) U.S. Cl. ............................ 315/308; 372/31
(58) Field of Classification Search ........ 315/307–309, 315/297, 291; 372/31, 29; 345/82, 76
See application file for complete search history.

(56) References Cited

U.S. PATENT DOCUMENTS 5,019,769 A * 5/1991 Levinson ...................... 372/31
6,292,497 B1 * 9/2001 Nakano ................... 372/29.015
6,914,395 B1 * 7/2005 Yamauchi et al. .......... 315/308
2004/0150590 A1 * 8/2004 Cok et al. ....................... 345/76
2005/0030267 A1 * 2/2005 Tanghe et al. ................. 345/82

* cited by examiner

Primary Examiner—Don Wong
Assistant Examiner—Hung Tran Vy
(74) Attorney, Agent, or Firm—Oblon, Spivak, McClelland, Maier & Neustadt, P.C.

(57) ABSTRACT

A controller for controlling a light emitting diode (LED) light engine. The controller includes a temperature sensor configured to sensor temperature at the LED light engine. A current sensor senses a drive current of the LED light engine. A voltage differential sensor senses a voltage differential across LEDs of the LED light engine. A timer monitors a time of operation of the LED light engine. Further, a control device controls the drive current to the LED light engine based on the sensed temperature, the sensed drive current, the sensed voltage differential, and the monitored time of operation. Further, the control device outputs an indication of intensity degradation of an LED, and if the intensity degradation exceeds a predetermined threshold the control can output an indication of such to a user, so that the user can be apprised that the LED needs to be changed.

12 Claims, 5 Drawing Sheets

INTELLIGENT DRIVE CIRCUIT FOR A LIGHT EMITTING DIODE (LED) LIGHT ENGINE

BACKGROUND OF THE INVENTION

1. Field of the Invention

The present invention is directed to a control device for a light emitting diode (LED) light engine, and more particularly to a control device that can efficiently control a drive current provided to the LED light engine.

2. Description of the Background Art

Light engines including LEDs as light sources are well known. An LED as a light source degrades over time, in contrast to an incandescent lamp that operates at a given light output and then at a specific time burns out and ceases to operate at all.

One manner to compensate for the long term degradation of light output by an LED is to initially drive the LED with a much higher driving current than is necessary for a desired light output. For example, an LED can be initially driven with a drive current at, for example, 30% higher than required for a desired light output. In that manner when the LED slowly degrades over time, the light output from the LED will decrease, but the light output can decrease 30% and still output the desired amount of light. For example in this instance if a LED degrades to output 30% less light over five years, then by initially driving the LED with 30% greater drive current than necessary to have a 30% greater light output, the LED will properly operate for five years before its light output falls below a desired level.

Further, in such a background system when the LED finally outputs less light than desired, i.e. in this example when the light output is degraded by greater than 30%, no clear indication is provided that the light output from the LED has significantly decreased or fallen below a determined threshold.

SUMMARY OF THE INVENTION

The applicant of the present invention recognized that such a background way of driving an LED has significant drawbacks in that it requires the LED to be driven harder than necessary and to consume significantly more energy than needed to provide a desired light output. That is, when the LED initially is driven with a drive current 30% higher than that necessary to achieve a desired light output, the LED will consume significantly more energy than needed. As one of the benefits of using LEDs is that they are more energy efficient than an incandescent bulb, driving an LED with more power than needed for a desired light output mitigates one of the benefits of using an LED. Also, driving LEDs with more power accelerates degradation of the LEDs and shortens their operating life, thereby mitigating another benefit of using LEDs.

Accordingly, one object of the present invention is to provide a novel device and method for driving an LED light engine that addresses and reduces the above-noted drawbacks in the background art.

A more specific object of the present invention is to provide a novel control for driving an LED light engine that is more energy efficient and leads to a longer operating life for an LED, by not initially driving an LED with a higher drive current than needed for a desired light output. The novel control of the present invention intelligently varies a drive current supplied to an LED light engine to drive an LED light engine to output a constant desired light output throughout its life.

Further, another object of the present invention is to provide a novel system and method for providing an indication when an LED light output has degraded below a certain point.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
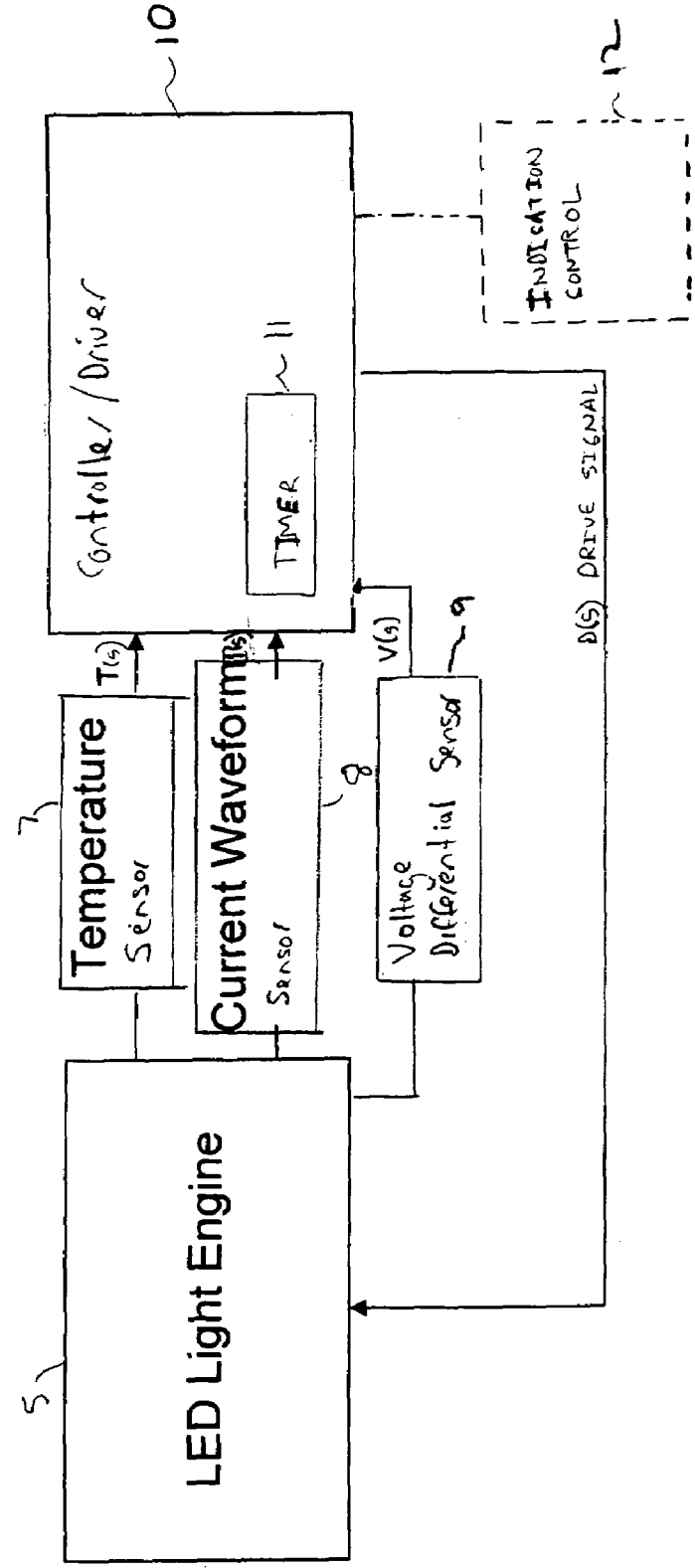
FIG. 1 shows an overview of a control system of the present invention.

Referring now to the drawings, wherein like reference numerals designate identical or corresponding parts throughout the several views, and more particularly to FIG. 1 thereof, an overview of a control system for driving an LED light engine 5 that contains LEDs, or at least one LED, for illumination is shown.

In FIG. 1, a temperature sensor 7 senses a temperature at the LED light engine 5, and outputs a sensed temperature signal T(s) based on the sensed temperature. A current waveform sensor 8 senses a drive current of the LED light engine 5 and outputs a corresponding sensed current waveform signal I(s). A voltage differential sensor 9 senses a voltage differential across the LEDs of the LED light engine 5 and outputs a corresponding voltage differential signal V(s).

A controller/driver 10 receives the sensed temperature signal T(s), the sensed current waveform signal I(s), and the sensed voltage differential signal V(s). The controller/driver 10 also includes a timer 11 that monitors a time that the LED light engine 5 operates. That is, the timer 11 starts a time count when the LED light engine initially starts to operate and continues to count the time that the LED light engine 5 operates. The controller/driver 10 further outputs a drive signal D(s) that drives the LED light engine 5. The controller/driver 10 is also connected to or includes an optional indication control 12, which can provide an indication when the LED light engine 5 has been calculated to have its light output degrade below a certain value.

Figure 2:
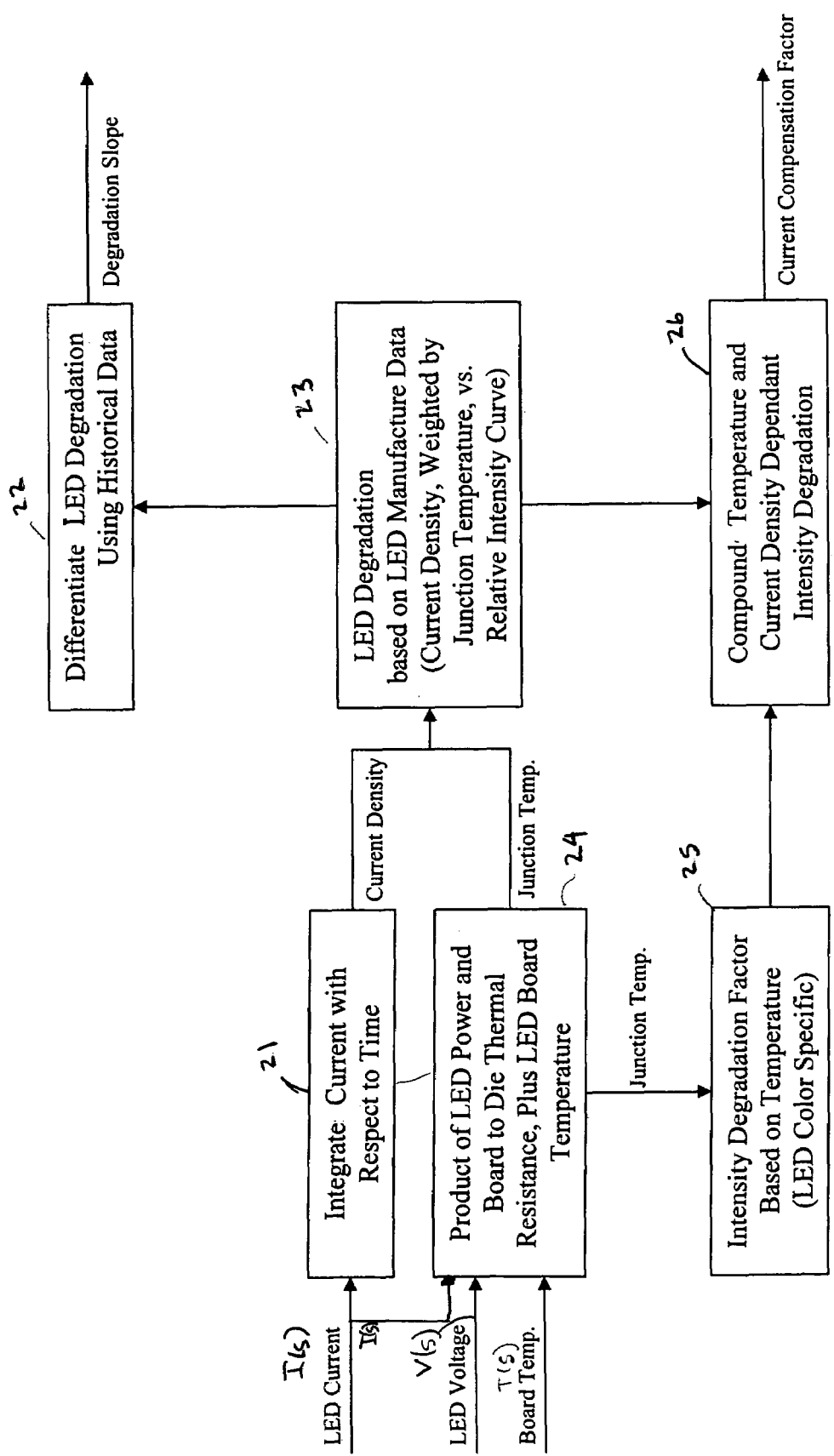
FIG. 2 shows a control operation performed in the control system of FIG. 1 of the present invention.

FIG. 2 shows control operations performed by the controller/driver 10 of FIG. 1; that is, the operation blocks shown in FIG. 2 are performed by the controller/driver 10.

As shown in FIG. 2 the sensed LED current I(s) is integrated with respect to time in an operation block 21 to output a current density signal. That operation essentially calculates the total drive current consumed by the LED light engine 5 over time. The LED current I(s), the sensed voltage differential V(s) at the LED, and the sensed temperature T(s) are provided into an operation block 24 that calculates a junction temperature.

As noted above, the voltage differential across LEDs of the LED light engine 5 is sensed by the voltage differential sensor 9. That voltage differential sensor 9 precisely scales the voltage and provides such a scaled voltage to an internal analog-to-digital (A/D) converter (not shown) of the voltage differential sensor 9. The A/D converter measures the voltage and sends a digital translation as the voltage differential signal V(s) to the controller/driver 10. The controller/driver 10 re-scales the reading for an actual measurement of the LED voltage across the LEDs of the LED light engine 5.

In the operation block 24, the product of the LED differential voltage V(s) and LED current I(s) divided by the number of LEDs gives the power dissipated in each device. The power of each device multiplied by the junction to board thermal resistance (° C./W) gives the temperature difference between the LED board of the LED light engine 5 and the LED junction. The LED junction is the semiconductor PN junction where light is emitted. The temperature difference added to the board temperature gives the LED junction temperature. That LED junction temperature is output from the operation block 24.

The current density and junction temperature are then provided to an operation block 23 that performs a degradation evaluation utilizing an LED degradation calculation based on LED manufacturer data.

LED manufacturers measure the percent of degradation of their LEDs based on drive current, time, and junction temperature. Operation block 23 utilizes that data from the LED manufacturers to determine the LED degradation based on the current calculated density, the calculated junction temperature, and the monitored time of operation of the LED light engine by the timer 11.

That is, an LED manufacturer provides data of relative light output based on the following three parameters: drive current, junction temperature, and hours of operation. In the present invention the manufacturers' cures are reduced to mathematical equations that explain the relative intensity change based on the degradation parameters. The manufacturer also supplies a graph of relative intensity compared to drive current. The present invention, as discussed further below, calculates what the degradation would be at any given time based on historical and present measurements (operation blocks 22 and 23), then compensates the drive signal D(s) to the LCD light engine 5 accordingly (operation block 30) to maintain light output based on the manufacturer's curve of drive current and relative intensity. The rate of degradation is tracked over time and as the compensation factor increases exponentially, because of continually increasing drive current that in turn increases power and junction temperature, the rate of degradation is compared to a threshold that determines an end of life (operation block 40). In addition, if the drive current cannot be increased enough in order to compensate the light loss from the degradation, because of the logarithmic nature of the current verses relative intensity, that signals end of life as well (operation block 41).

The junction temperature output from operation block 24 is also provided to an operation block 25 in which an intensity degradation factor based on temperature is determined. Manufacturer data from an LED provides information as to the extent to which increases in temperature decrease the output light intensity of the LED light engine 5. That information will be color specific. That is, LEDs are known to output less light as their temperature rises. Operation block 25 performs a calculation to determine the extent of the light output intensity degradation of the LED light engine 5 based on temperature for the specific color LED.

The determined intensity degradation factor based on temperature from operation block 25 is then provided to an operation block 26. Further, the determined LED degradation from operation block 23 is also provided to the operation block 26.

The operation block 26 compounds the temperature and current density dependent intensity degradations from operation blocks 25 and 23 to determine a total intensity degradation of an LED. The operation block 26 then outputs a current compensation factor indicating how much the intensity of the LED has degraded, i.e. outputs a current compensation factor based on the determined total LED intensity degradation.

Further, the output of the LED degradation calculation based on LED manufacturing data in operation block 23 is provided to an operation block 22 that differentiates LED degradation using historical data. The controller/driver 10 periodically stores in a memory calculated degradation rate information, and based on that historical data the controller/driver 10 calculates the slope of the degradation rate. The change of the degradation rate and the degradation rate itself indicate when the useful life of the LED light engine 5 ends. That is, the operation block 22 outputs information indicating a slope of the degradation rate, i.e. the rate of the degradation of light output from the LED light engine 5. When that rate becomes too high it can be determined that the LED light engine 5 has failed. That calculation is also performed based on manufacturer data for the LED light engine 5. That is, a manufacturer's data of an LED light engine 5 will indicate that when the degradation slope reaches a certain value the useful life of the LED light engine 5 has ended. The operation block 22 calculates and outputs a degradation slope for the LED light engine 5.

Figure 3:
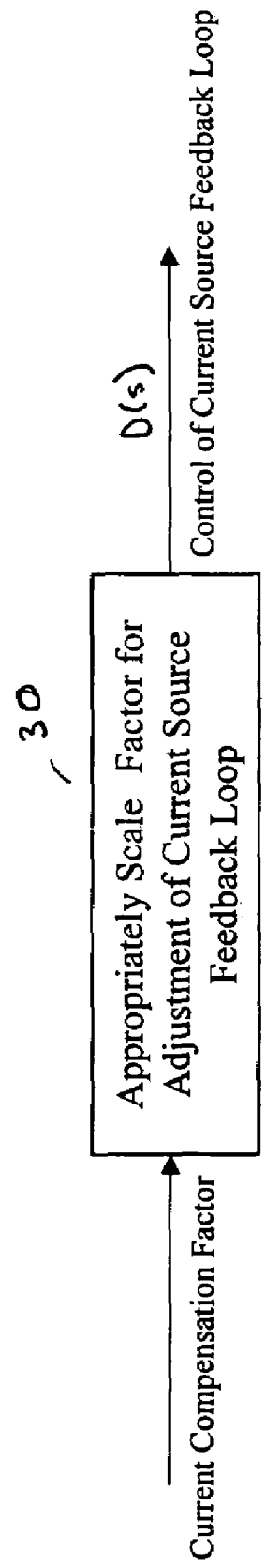
FIG. 3 shows a further control operation performed in the control system of FIG. 1 of the present invention.

An operation to control the drive signal D(s) to drive the LED light engine is performed in the operation of FIG. 3. More particularly, in FIG. 3 an operation block 30 is executed to appropriately adjust the drive signal D(s) based on the current compensation factor output from operation block 26. For example, if because of increased temperature and aging of the LED the light output by the LED degrades by 10%, the current compensation factor can increase the drive current to the LED so that it is increased to offset that 10% degradation decrease.

With the operation noted above, the controller/driver 10 can operate so that the LED light engine 5 outputs a constant amount of light. As the LED light engine starts to degrade the drive signal D(s) is increased so that the LED light engine 5 is driven harder, and thereby the LEDs within the LED light engine 5 are driven harder, so that the light output by the LED light engine 5 will be maintained to be constant. Thus, with such an operation the LED light engine 5 does not have to be driven initially at a higher drive current than needed to achieve a desired light output, but instead in the present invention the LED light engine 5 is driven to constantly output the same light output throughout its useful life by increasing the drive current D(s) over time and with changes in temperature, as needed.

With reference to FIG. 1 again, as an optional feature an indication control 12 can be provided to provide an indication to the operator of the LED unit that it has degraded below a desired level. That is, as noted above LEDs degrade over time and with increases in temperature. If an LED degrades too much the drive signal D(s) provided to the LED light engine 5 may not be adequate to drive the LED light engine 5 hard enough to provide the desired light output. One operation of the present invention is to determine when the LED light source 1 has degraded to such a level that it should no longer be in use, i.e. to such a level that the drive signal D(s) may not be adequate to achieve the proper light output from the LED light engine 5. Such an operation is disclosed in FIG. 4.

Figure 4:
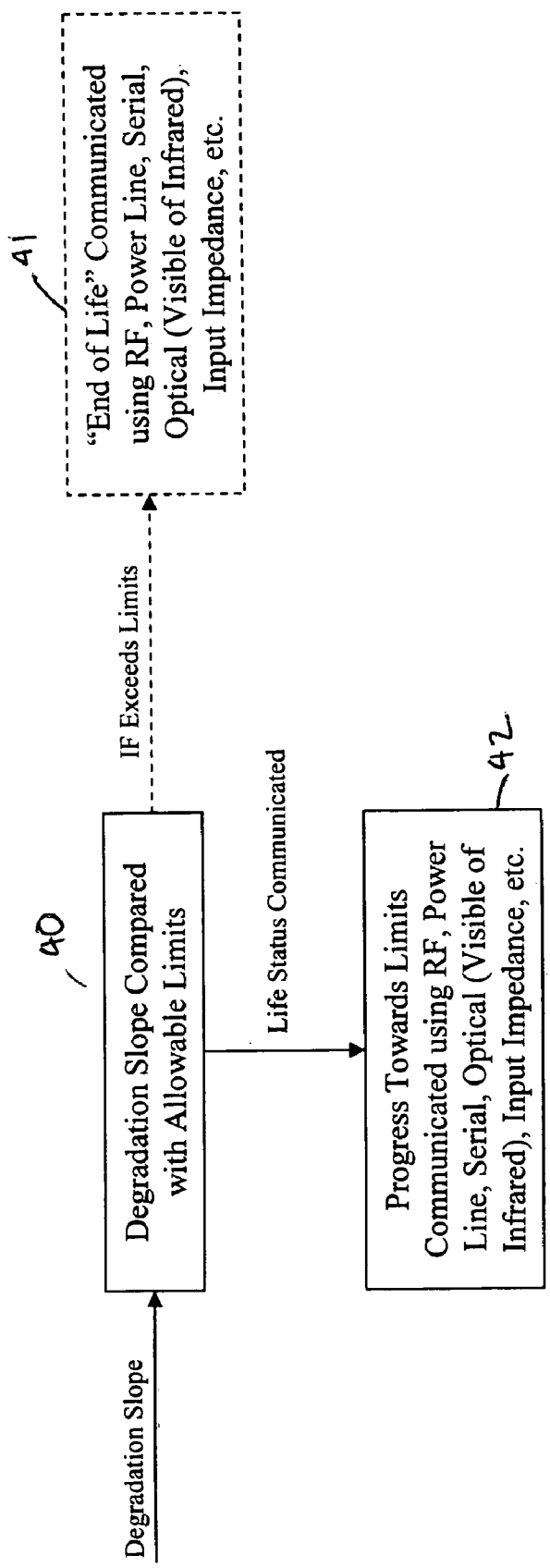
FIG. 4 shows another control operation performed in the control system of FIG. 1 of the present invention.

In FIG. 4 the degradation slope output from the operation block 22 is provided to an operation block 40 in which the degradation slope is compared with allowable limits. When it is determined that the degradation slope exceeds an allowable limit, the operation proceeds to operation block 41. In operation block 41 an end of life signal is communicated to an operator of the LED by any desired communication operation such as by an RF signal, by providing a signal along the power line, by providing a signal on a separate cable or wire, by providing an optical (visible or infrared) signal, by changing input impedance, by a serial communication, or by providing for a visual change in how the LED signal transitions to the ON or OFF state, etc.

Further, if the comparison in operation block 40 indicates that the degradation slope has not reached the allowable limits, a communication can still be provided as to the status of the LED in an operation block 42. In operation block 42 a life status data of the LED can be provided, for example an indication that the LED has degraded 5%, 10%, etc. may be communicated. That communication can also be made by any of the communications noted above with respect to operation block 41.

Figure 5A:
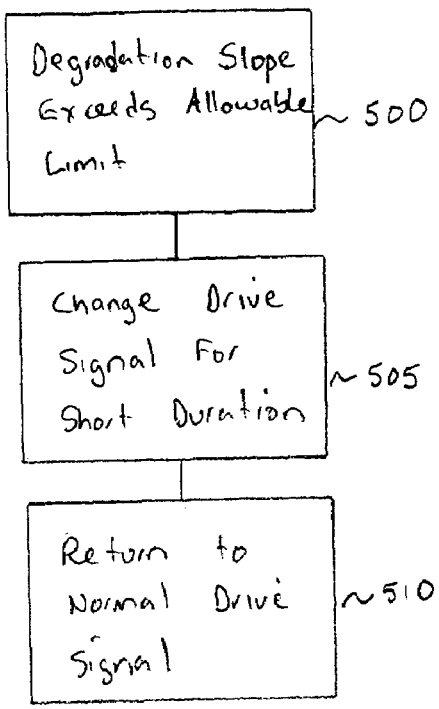
FIGS. 5A and 5B show another control operation performed in the control system of FIG. 1 of the present invention.
Figure 5B:
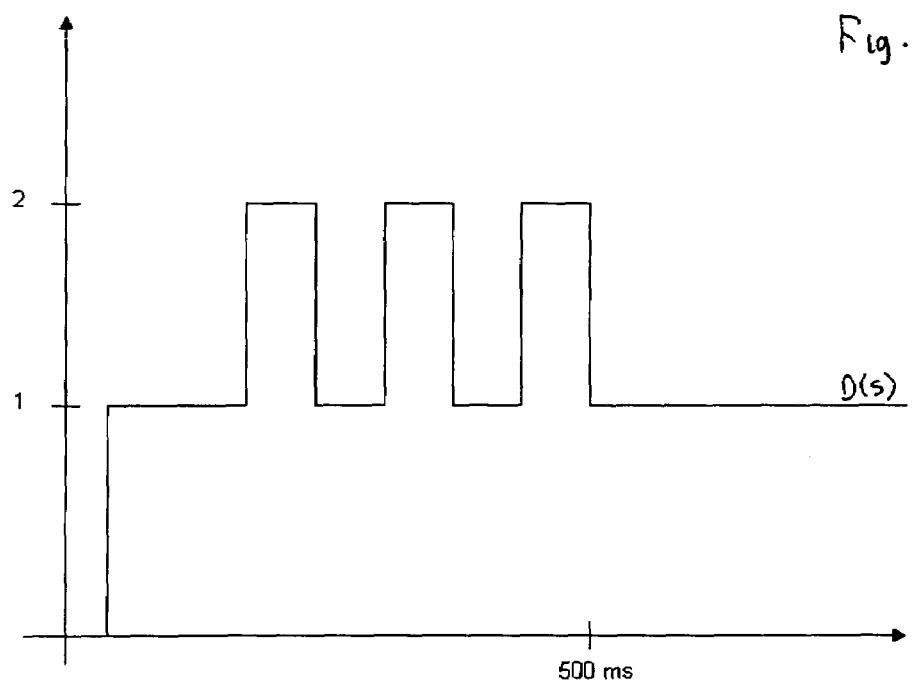

One particular way in which an indication can be provided that the LED has degraded beyond a desired limit may be by a visual indication when the LED transitions to an ON or OFF state, which is shown in FIGS. 5A, 5B.

One way to provide such a visual indication is that when it is determined that the LED light engine 5 has degraded below a certain value, i.e. its degradation slope exceeds the maximum allowable limit as determined by operation block 40, step 500 in FIG. 5A, the drive signal D(s) output by the controller/driver 10 is changed, for example increased in intensity several times in a first few milliseconds (e.g., 500 ms) after a transition from the ON or OFF state, step 505 in FIG. 5A. After that visual indication is given by the change in the drive signal D(s), the drive signal D(s) returns to its normal value, step 510 in FIG. 5A. The specific form of such a change in the device signal D(s) is shown in FIG. 5B, which shows the drive signal D(s) being increased in intensity for a short duration of 500 ms after a transition to an ON state; and the same change in the drive signal D(s) can also take place in a transition to an OFF state. Such a change in the drive signal D(s) would result in a noticeable flicker in the output of the light by the LED light engine 5. When an operator of the LED light engine 5 notices such a flicker that would be an indication that the unit should be replaced.

Obviously, numerous modifications and variations of the present invention are possible in light of the above teachings. It is therefore to be understood that within the scope of the appended claims, the present invention may be practiced otherwise than as specifically described herein.

The invention claimed is:

1. A controller for controlling a light emitting diode (LED) light engine comprising:
    a temperature sensor configured to sense temperature at the LED light engine;
    a current sensor configured to sense a drive current of the LED light engine;
    a voltage sensor configured to sense a voltage differential across LEDs of the LED light engine;
    a timer configured to monitor a time of operation of the LED light engine; and
    a control device configured to control the drive current to the LED light engine based on the sensed temperature, the sensed drive current, the sensed voltage differential, and the monitored time of operation such that the LED light engine outputs a same desired light output throughout its useful life.

2. A controller according to claim 1, wherein the control device controls the drive current of the LED light engine based on integrating the sensed drive current with respect to time.

3. A controller according to claim 1, wherein the control device controls the drive current to maintain a light output of an LED based on comparing the sensed temperature with stored intensity degradation factor data correlating an intensity degradation factor with temperature and a color of the LED.

4. A controller according to claim 1, wherein the control device controls the drive current to maintain a light output of an LED based on comparing the monitored time with stored data correlating an intensity degradation factor with time.

5. A controller according to claim 1, wherein the control device further outputs an indication if the intensity degradation factor data exceeds a predetermined threshold.

6. A controller according to claim 5, wherein the indication is a variation in intensity in the drive current to the LED light engine for a predetermined period of time in a transition of the LED light engine from an ON or OFF state.

7. A controller for controlling a light emitting diode (LED) light engine comprising:
    means for sensing temperature at the LED light engine;
    means for sensing a drive current of the LED light engine;
    means for sensing a voltage differential across LEDs of the LED light engine;
    means for monitoring a time of operation of the LED light engine; and
    means for controlling the drive current to the LED light engine based on the sensed temperature, the sensed drive current, the sensed voltage differential, and the monitored time of operation such that the LED light engine outputs a same desired light output throughout its useful life.

8. A controller according to claim 7, wherein the means for controlling controls the drive current of the LED light engine based on integrating the sensed drive current with respect to time.

9. A controller according to claim 7, wherein the means for controlling controls the drive current to maintain a light output of an LED based on comparing the sensed temperature with stored intensity degradation factor data correlating an intensity degradation factor with temperature and a color of the LED.

10. A controller according to claim 7, wherein the means for controlling controls the drive current to maintain a light output of an LED based on comparing the monitored time with stored data correlating an intensity degradation factor with time.

11. A controller according to claim 7, wherein the means for controlling further outputs an indication if the intensity degradation factor data exceeds a predetermined threshold.

12. A controller according to claim 11, wherein the indication is a variation in intensity in the drive current to the LED light engine for a predetermined period of time in a transition of the LED light engine from an ON or OFF state.

* * * * *